United States Patent Office 2,721,879
Patented Oct. 25, 1955

2,721,879

ALDEHYDES AS POLYMERIZATION MODIFIERS IN THE PRODUCTION OF LIQUID POLYMERS

Alexander H. Popkin, New York, N. Y., and James M. Phelan, Cranford, N. J., assignors to Esso Research and Engineering Company, a corporation of Delaware No Drawing. Application August 18, 1951, Serial No. 242,578

11 Claims. (Cl. 260—485)

This invention relates to an improved polymerization process. Particularly this invention relates to a process for the formation of lubricating oil additives having the desirable characteristic of improving the pour point and viscosity characteristics of lubricating oils with which they are blended. More particularly this invention relates to an improved process for the copolymerization of unsaturated polycarboxylic acid esters with other polymerizable monomeric materials in the presence of an aliphatic aldehyde to prevent undesirable gelation.

The art of lubricating oil additive manufacture has long been familiar with the preparation of polymers and copolymers to form materials useful for improving desirable characteristics of lubricating oils. Of particular interest in recent years has been the development of additive materials for improving the viscosity index, that is, for reducing the rate of change of viscosity of an oil with a change in temperature, and for improving the pour point of a lubricating oil, that is, lowering the temperature at which the lubricating oil loses its property of free flow. Such materials as polymers and copolymers of acrylate and methacrylate esters, polymers and copolymers of alpha-beta unsaturated polycarboxylic acid esters, etc., have been found to be very satisfactory for many purposes. It has also been found, however, that the preparation of these polymers and copolymers presents many technical difficulties. Foremost among them is the problem of gelation and the formation of oil insoluble products. It is believed that this phenomenon is a result of undesirable cross linking or interlinking of neighboring long chain molecules with the result that the product formed remains a cohesive mass and will not dissolve in oil. In cases where there is insufficient cross linkage present to cause gelation and oil insolubility of the product, there may be present sufficient cross linkage to result in products having greatly reduced potency.

It has now been found, and forms the object of this invention, that copolymers having outstanding utility as pour point depressants and viscosity index improvers may be prepared by a process utilizing an aliphatic aldehyde in the copolymerization step with the formation of a product which is free from any tendency toward oil insolubility and has increased potency as a pour point depressor and increased stability when employed as a viscosity index improver.

Generally speaking, this invention involves the admixture of the materials to be copolymerized and subjecting the mixture to the action of an aliphatic aldehyde at some point during the copolymerization. The presence of the aldehyde permits the reaction to proceed mildly and under the easily controlled exothermic effects that are characteristic of true copolymerization reactions, without the vigorous exothermic effects that are associated with cross-linking and gel formation. The aldehyde can be added entirely at the start of the copolymerization or in portions periodically during the copolymerization, or whenever a tendency toward vigorous exothermic effects or gel formation is noted.

The improved process of this invention is applicable to copolymerization of copolymerizable materials in general. It has particular advantage, however, when applied to the copolymerization of esters of unsaturated polycarboxylic acids with other polymerizable monomeric materials in the presence of peroxide catalysts.

The unsaturated polycarboxylic acid esters may be represented by the following formula:

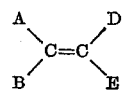

wherein:

(1) A and D are carboxylic acid ester groups

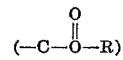

and B and E are hydrogen, e. g., fumaric acid esters, maleic acid esters, etc.; or (2) A and D are carboxylic acid ester groups, as above, and either B or E is a methyl group, the other being hydrogen, e. g., citraconic acid esters, mesaconic acid esters, etc.; or (3) A and B are hydrogen, D is a carboxylic acid ester group, and E is a methylene carboxylic acid ester group, e. g., itaconic acid esters, etc.; or (4) A and D are carboxylic acid ester groups as above, E is a methylene carboxylic acid ester group, and B is hydrogen, e. g., aconitic acid esters.

It will be noted that all of these compounds contain unsaturation in the position alpha-beta to at least one carboxy group.

Although any of the polycarboxylic acid esters, according to the formula above or mixtures of such polycarboxylic acid esters are operable in the process of this invention, the maleate and fumarate esters or mixtures thereof are particularly advantageous. Mixtures of two or more of such unsaturated polycarboxylic acid esters in varying proportions, i. e., 10–90 parts fumaric and 90–10 parts maleic ester, may be used in place of only one ester.

The esters may be prepared by esterification of any of the unsaturated polycarboxylic acids or their corresponding anhydrides with which the art is familiar.

The alcohols used in preparing the esters of the polycarboxylic acids or their anhydrides are selected from the $C_1$ to $C_{18}$ aliphatic alcohols. Primary alcohols are preferred over secondary and tertiary alcohols, although secondary alcohols are sometimes suitable. The alcohols are preferably saturated, although some degree of unsaturation is permissible when mixtures of alcohols are employed. Straight chain or lightly branched alcohols are preferred over highly branched alcohols.

In the alcohols selected for preparing the esters, there should be sufficient hydrocarbon content to insure solubility of the final polymer products in lubricating oils, which in the case of most oils requires that the alcohols have on the average at least about 7.5 carbon atoms per molecule. When employing single alcohols those ranging from $C_8$ to $C_{18}$ are suitable. When mixtures of alcohols are employed, those ranging from $C_1$ to $C_{18}$ can be used in such proportions that the average is about $C_{7.5}$ or greater.

In general, the products prepared according to the invention are both pour point depressants and viscosity index improvers. However, for optimum potency it is usually desirable to select the alcohols used in preparing the esters so that the product will be primarily a pour point depressant or primarily a viscosity index improver. For optimum pour depressing potency in a wide variety of mineral lubricating oils the alcohols should have on the average about 11 to about 15, preferably 11.5 to 14, carbon atoms per molecule. For optimum potency as a viscosity index improver the alcohols should have on the average about 7.5 to 11, preferably 8 to 10, carbon atoms per molecule. Exceptions are sometimes found, for example, products prepared from relatively short chain alcohols are good pour depressants in relatively light oils such as those employed as hydraulic fluids and power transmission fluids. For potent pour depressants, alcohols having long straight chains are greatly preferred. Some branching in some of the alcohols is permissible, for example, mixed 2-ethylhexyl and cetyl alcohols are suitable, but a highly branched $C_{13}$ alcohol is entirely unsuitable for the production of pour point depressants unless employed with other alcohols having relatively long straight chains.

Among the alcohols that may be mentioned specifically as having utility in this invention are octyl, isooctyl, 2-ethylhexyl, nonyl, 2,2,4,4-tetramethylamyl, decyl, dodecyl, tetradecyl, cetyl, and stearyl alcohols. Mixtures of the above are operable so long as the components of the mixture are adjusted so that the average number of carbon atoms of the mixture is between 8 and about 18 carbon atoms. Thus methyl alcohol may be admixed with stearyl alcohol to obtain a mixture having an average side chain length within the desired range.

One especially desirable mixture of alcohols operable in this invention is the commercially available mixture known as "Lorol-B" alcohol and obtained by hydrogenation and refining of coconut oil. The distribution of the alcohols of this mixture and other commercially available alcohols are shown in the following table:

*Coconut oil alcohols*

| Percent of— | Lorol | Lorol B | Lorol 5 | Lorol 7 |
|---|---|---|---|---|
| Decyl | 4 | 3 | 2.6 | 2.5 |
| Lauryl | 55 | 46 | 61.0 | 55.5 |
| Tetradecyl | 22 | 24 | 23.0 | 21.0 |
| Hexadecyl | 14 | 10 | 11.2 | 10.2 |
| Octadecyl | 4 | 17 | 2.2 | 10.8 |
| Aver | 12.8 | 13.5 | 13.0 | 13.4 |

The preferred embodiment of this invention involves the use of esters of alpha-beta unsaturated dicarboxylic acids wherein the alcohol components of the ester contains an average of from 11 to 14 carbon atoms, the alcohols obtained by the hydrogenation of coconut oil being included within this preferred range.

Also very desirable copolymers may be formed by copolymerizing the polycarboxylic acid esters as described above with other polymerizable monomeric materials. These materials may be represented by the following formula:

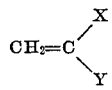

wherein:

(1) X is hydrogen and Y is an ester group

R being methyl, ethyl, butyl, and the like), e. g., vinyl acetate, vinyl butyrate, and the like; or (2) X is methyl and Y is as described above, e. g., isopropenyl acetate, etc.; or (3) X is a halogen and Y is as described above, e. g., alpha-chlorovinyl acetate, etc.; or (4) X is hydrogen or methyl and Y is an aromatic group, e. g., styrene, alpha-methyl styrene, and the like; or (5) X is hydrogen or methyl and Y is —C≡N, e. g., acrylonitrile, etc.

Although any of the polymerizable monomeric materials typified by the formula above are operable to form useful copolymers with the polycarboxylic acid esters, the preferred embodiment contemplates the use of low molecular weight vinyl compounds and their substitution products. Vinyl esters such as vinyl acetate, isopropenyl acetate, etc., are particularly desirable. Mixtures of vinyl esters such as 10–90 parts of vinyl acetate and 90–10 parts of isopropenyl acetate may be used in the place of straight vinyl esters.

Depending upon the desired product, the monomers in the copolymerization reaction utilizing the process of invention may be varied greatly. However, when a copolymer of a polycarboxylic acid ester and vinyl acetate is being prepared, it is desirable that from 2% to 40% of vinyl acetate, preferably 10% to 25%, be used with the polycarboxylic acid ester. A copolymer of 80% dicarboxylic acid ester with 20% vinyl acetate has outstanding pour depressant qualities.

The process of the instant invention may be applied to any of the well known polymerization techniques. For instance, the bulk polymerization technique wherein the catalyst used is added directly to the mixture of the monomers alone may be used applying the process to invention. If it is desired, the solution polymerization technique may be utilized, that is, the technique in which the monomers are polymerized in solution in a solvent, for example, naphtha, lubricating oil fractions, white oils, benzene, toluene and other petroleum hydrocarbons, ether, esters, and chlorinated or fluorinated hydrocarbons such as chloroform, carbon tetrachloride, methylene chloride, tri-chloroethylene, etc. When the solution polymerization technique is used, it is preferred that the monomer concentration in the diluent range from 30% to 99% by weight, based on the weight of the total mixture. The suspension technique of polymerization or the emulsion polymerization technique wherein an emulsifying agent such as a soap is used to form an emulsion of the monomers and water and a water soluble catalyst is utilized may also be adapted to the process of invention with excellent results.

The reaction conditions to be experienced in the inventive process may also be varied within wide ranges. In the preferred embodiment, the copolymerization of dicarboxylic acid esters with other polymerizable materials, it is preferred that temperatures within a range of from room temperature to 250° F. be used, preferably 100° to 200° F. The time of the reaction may be varied between about 1 and 50 hours with from 3 to 24 hours ordinarily being sufficient. In most instances it will be found advantageous to utilize from 0.05% to 3% by weight, based on the weight of the monomers, of a peroxide catalyst, with 0.2% to 2.0% by weight being preferred. Among the operable catalysts are hydrogen peroxide, benzoyl peroxide, cumene hydroperoxide, potassium persulfate, lauroyl peroxide, ammonium persulfate, urea hydroperoxide, tert.-butyl hydroperoxide, tert.-butyl perbenzoate, and the like, benzoyl peroxide being used in the preferred embodiment. Reduction-oxidation catalyst systems known as Redox systems may also be employed to good effect. The catalyst may be added entirely at the start, or in several portions throughout the course of the reaction.

To summarize briefly, the process of this invention is carried out by adding to the mixture of monomers during or before the copolymerization a small amount of an aliphatic aldehyde or mixtures of aldehydes characterized by the following general formula:

wherein R is a straight chain or branched chain alkyl group of from 1 to 21 carbon atoms.

The quantity of the aliphatic aldehyde which is employed in the process of this invention ranges from 0.1% to 10.0% by weight. Amounts within the range of from 0.5% to 5.0% inclusive have been found to be particularly effective. Of the aldehydes employed in the above general formula those in which R is an alkyl group of from 2 to 10 carbon atoms are particularly operable, propionaldehyde being particularly desirable. Other useful aldehydes include butylaldehyde, isobutyraldehyde, valeraldehyde, hexaldehyde, hexenaldehyde, tetradecylaldehyde, octadecenyl aldehyde, and octadecyl aldehyde. Excellent results are obtained with the Oxo aldehydes derived by reacting carbon monoxide and hydrogen with olefins, for example propylene and isobutylene and their $C_6$ to $C_{18}$ polymers and copolymers.

The inventive concept described above may be more specifically understood by reference to the following examples:

EXAMPLE I

The following materials were mixed in the amounts and proportions indicated and heated under a nitrogen atmosphere in a flask equipped with a glass stirrer to a temperature of 43° C. at which temperature copolymerization of the monomers began and proceeded with the evolution of heat sufficient to maintain the reactants at the desired reaction temperature without introduction of heat from external sources.

| Materials | Amounts |
| --- | --- |
| Decyl Maleate (monomer)[1] | 1,190.0 g. (3 mols). |
| Vinyl Acetate (monomer)[1] | 322.0 g. (3.75 mols). |
| Chloroform (diluent) | 331.0 g. |
| Benzoyl Peroxide (catalyst) | 15.1 g. |
| Benzoin (promoter) | 18.9 g. |
| Ferric Laurate (promoter) | 0.76 g. |

[1] Decyl maleate/vinyl acetate, mol ratio = 1.0/1.25.

The progress of this reaction using the materials listed above and initiated in the apparatus and manner described above, including the observance of the initial phases of gelation and the arresting action of propionaldehyde on said gelation, is described in the following table:

TABLE I

| Elapsed Reaction Time (Min.) | Reaction Temperature (° C.) | Copolymer Yield (Wt. Percent of Total Monomers) | Average Copolymer Molecular Wt. (Staudinger Equation) | Observations and Remarks |
| --- | --- | --- | --- | --- |
| 0 | 43.0 | 0.0 | | Reaction initiated (evolution of heat of reaction became noticeable). |
| 10 | 43.0 | 6.8 | 8,400 | Reaction smooth; slow rate of thickening. |
| 70 | 42.7 | 27.7 | 9,800 | Reaction smooth; slow rate of thickening. |
| 130 | 44.1 | 45.0 | 10,300 | Reaction smooth; slow rate of thickening. |
| 205 | 51.0 | | | Rapid gelation began as evidenced by a noticeably sharp increase in viscosity of the reactants, greatly increased difficulty of stirring, tendency of the mixture to cling in a single mass to the stirrer, and general striated appearance of the mixture. Immediately following these observations, 20 grams of propionaldehyde were added to the mixture whereupon stirring was immediately facilitated and the mixture became sufficiently fluid once more so that the reaction could be continued. |
| 230 | 48.5 | 67.6 | 13,900 | |
| 265 | 48.5 | | | Mixture was diluted with 1,000 g. of chloroform and stirred for 17 hours while cooling to 25° C. |
| | | Final Yield | Final Mol. Wt. | |
| | | 83.0 | 14,000 | |

The data given in Table I indicate that propionaldehyde not only arrested gelation and prevented further gelation thereby correcting a situation which would inevitably have led to an oil-insoluble product, unusable and difficult to dispose of, but, in addition did not prevent further copolymerization with subsequent increase in yield from taking place in normal fashion. Blending data obtained for the final copolymer product in two different base stocks and given in Table II following, testify to the value of this product as a viscosity index improver.

TABLE II

*Blending data for copolymer described in Table I (83% yield; 14,000 mol wt.)*

| Base Stock | Weight Percent Copolymer | Viscosities (S. U. S.) | | Viscosity Index |
| --- | --- | --- | --- | --- |
| | | 100° F. | 210° F. | |
| Oil A [1] | 0.0 | 169.5 | 45.5 | 115.0 |
| Oil A | 3.0 | 257.2 | 61.0 | 149.4 |
| Oil B [2] | 0.0 | 433.4 | 55.6 | 68.6 |
| Oil B | 3.0 | 733.7 | 86.3 | 117.0 |

[1] Dewaxed, solvent extracted Mid-Continent base.
[2] Acid treated Coastal stock.

EXAMPLE II

A fumarate ester was prepared from equimolar quantities of fumaric acid and Lorol B alcohol and was washed with dilute alkali before use. Into a liter round-bottomed flask were placed 120 g. of the fumarate ester and 7.5 g. of Lorol B alcohol. Into this mixture, 30 g. of freshly distilled vinyl acetate were added along with 1.5 g. of benzoyl peroxide as a catalyst. The reaction mixture was heated to a temperature within a range of from 130 to 140° F. and maintained at this temperature for about 24 hours. The product was an oil-insoluble gel.

EXAMPLE III

Using the same ingredients and reaction conditions as in Example II above except that 5 weight percent of propionaldehyde in place of Lorol B alcohol was added at the start of the reaction, a fumarate ester-vinyl acetate copolymer was obtained which had excellent appearance and gave excellent pour point depressing potency when tested in a Mid-Continent SAE 20 grade oil.

EXAMPLE IV

Example III was repeated using 1% propionaldehyde instead of the 5% used in Example III. This material was also tested as a pour point depressant and gave excellent results.

On the materials of Examples II through IV the standard ASTM pour point depressing test was conducted using as a base oil a Mid-Continent SAE 20 grade oil. The standard viscosity determinations were also made on a blend of 20% of the copolymer in a paraffinic distillate having a viscosity at 210° F. of about 43 S. U. S. and a viscosity index of about 112. The data of these standard determinations are set out in Table III below.

TABLE III

*Effect of aldehyde on copolymerization*

| Example | Wt., Percent Propionaldehyde | Percent Monomer Conc. | Vis./210 °F., S. U. S. of 20% Copolymer Blend in Oil C[1] | ASTM Pour Point, ° F. of Blends in Mid.-Cont. SAE 20 Base in Indicated Wt. Percent Act. Ingr. Conc. | | | |
| --- | --- | --- | --- | --- | --- | --- | --- |
| | | | | 0.025 | 0.020 | 0.015 | 0.010 |
| II | None | 95 | Gel | Gel | Gel | Gel | Gel |
| III | 5 | 95 | 61 | −30 | −20 | −15 | −5 |
| IV | 1 | 99 | 281 | −20 | −20 | −20 | −15 |

[1] Dewaxed, solvent extracted Mid-Continent base stock.

An examination of the data in Table III above will point out the fact that even when only 1% of the aliphatic aldehyde is present a potent pour point depressant is obtained when a coconut alcohol fumarate ester is used. It is also to be noted that under the same reaction conditions, but without the aldehyde, this coconut alcohol ester of fumaric acid results in the formation of an oil insoluble gel.

Other aliphatic aldehydes were also tested under the same conditions and found to have excellent gel-inhibiting properties as shown by the data in the following table:

TABLE IV

*Effect of aldehydes on inhibiting gel-formation (80–20 "Lorol B" fumarate-vinyl acetate copolymerization; 140° F. reaction temperature, 1.0 weight percent benzoyl peroxide catalyst)*

| Aldehyde | Wt. Percent | Appearance |
|---|---|---|
| None | | Gel. |
| Acetaldehyde | 1.0 | Heavy copolymer—soluble in oil. |
| n-Butyraldehyde | 1.0 | Do. |
| C₉ "Oxo" aldehyde | 1.0 | Do. |

The heavy copolymers obtained as indicated above were similar in physical appearance to those products described previously which were obtained with propionaldehyde.

The products prepared by the process of this invention may be blended with lubricating oils in concentrations varying from 0.001% to 10% active ingredient. For pour depressing action it is preferred that from 0.003% to 5% of the additive be blended with the lubricating oil. For viscosity index improvement amounts varying between 0.5% and 10% may be used. If it is desired, concentrates of the additives of invention may be prepared containing as high as 90% by weight of the additive material. It is often desirable to prepare these concentrates in such high concentrations for ease in handling, shipping, and storage.

The lubricant additives prepared according to the concept of this invention may be blended with any of the other known lubricant additives with excellent results. They can be used in motor oils, hydraulic oils, refrigerator oils, and as wax modifiers, etc. The inventive products are perfectly compatible with such materials as extreme pressure agents, oxidation inhibitors, other pour depressants, other viscosity index improvers, oiliness agents, corrosion inhibitors, and the like.

What is claimed is:

1. In a process for the preparation of lubricating oil additive materials which comprises copolymerizing (1) a substantially neutral ester of (a) substantially saturated primary aliphatic alcohol containing in the range of 1 to 18 carbon atoms and averaging about 7.5 or more carbon atoms per molecule and of (b) a material of the class consisting of alpha, beta unsaturated polycarboxylic acids and their anhydrides with a low molecular weight vinyl ester in the presence of a peroxide catalyst, the improvement which comprises the use of about 0.1 to 10% by weight of an aliphatic aldehyde having the general formula $$R-C\overset{O}{\underset{H}{\diagdown}}$$

wherein R is an alkyl group containing from 1 to 21 carbon atoms, said aldehyde being soluble in the copolymerization mixture.

2. Process according to claim 1 wherein said material of the class is fumaric acid.

3. Process according to claim 1 wherein said low molecular weight vinyl ester is vinyl acetate.

4. In a process for the formation of lubricating oil additive materials which comprises copolymerizing (1) about 98 to 60% by weight of a substantially neutral ester of (a) substantially saturated primary aliphatic alcohol containing in the range of 8 to 18 carbon atoms per molecule and of (b) a material of the class consisting of alpha, beta unsaturated polycarboxylic acids and their anhydrides with (2) about 2 to 40% by weight of a low molecular weight vinyl ester in the presence of a peroxide catalyst, the improvement which comprises the use of about 0.5 to 5.0% by weight of an aliphatic aldehyde having the general formula $$R-C\overset{O}{\underset{H}{\diagdown}}$$

wherein R is an alkyl group containing from 2 to 10 carbon atoms.

5. A process according to claim 4 wherein said aldehyde is propionaldehyde.

6. Process according to claim 4 wherein said aldehyde is an oxo aldehyde.

7. In a process for the formation of lubricating oil additive materials which comprises copolymerizing (1) about 90 to 75% by weight of a diester of (a) substantially saturated primary aliphatic alcohol containing in the range of 8 to 18 carbon atoms per molecule and of (b) an alpha, beta unsaturated dicarboxylic acid with (2) about 10 to 25% by weight of a low molecular weight vinyl ester in the presence of a peroxide catalyst, the improvement which comprises the use of about 0.5 to 5.0% by weight of an aliphatic aldehyde having the general formula $$R-C\overset{O}{\underset{H}{\diagdown}}$$

wherein R is an alkyl group containing from 2 to 10 carbon atoms.

8. A process according to claim 7 wherein said aldehyde is propionaldehyde.

9. A process according to claim 7 wherein said aldehyde is n-butyl aldehyde.

10. A process according to claim 7 wherein said aldehyde is a C₉ oxo aldehyde.

11. A lubricating oil additive material having the desirable characteristic of improving the quality of a mineral lubricating oil into which it has been incorporated which has been prepared by an improved process which comprises copolymerizing (1) about 98 to 60% by weight of a substantiailly neutral ester of (a) substantially saturated primary aliphatic alcohol containing in the range of 8 to 18 carbon atoms per molecule and of (b) a material of the class consisting of alpha, beta unsaturated polycarboxylic acids and their anhydrides with (2) about 2 to 40% by weight of a low molecular weight vinyl ester in the presence of a peroxide catalyst and about 0.1 to 10.0% by weight of aliphatic aldehyde having the general formula $$R-C\overset{O}{\underset{H}{\diagdown}}$$

wherein R is an alkyl group containing from 2 to 10 carbon atoms.

References Cited in the file of this patent

UNITED STATES PATENTS

| 2,366,517 | Gleason | Jan. 2, 1945 |
| 2,460,035 | Rogers | Jan. 25, 1949 |
| 2,570,788 | Giammaria | Oct. 9, 1951 |